US009008886B2

(12) United States Patent
Braunstein et al.

(10) Patent No.: US 9,008,886 B2
(45) Date of Patent: Apr. 14, 2015

(54) METHOD OF MODIFYING A WORKSITE

(71) Applicant: Caterpillar Inc., Peoria, IL (US)

(72) Inventors: Michael Braunstein, Washington, IL (US); Ramadev Hukkeri, Pittsburgh, PA (US); Michael Taylor, Swissvale, PA (US)

(73) Assignee: Caterpillar Inc., Peoria, IL (US)

( * ) Notice: Subject to any disclaimer, the term of this patent is extended or adjusted under 35 U.S.C. 154(b) by 104 days.

(21) Appl. No.: 13/712,490

(22) Filed: Dec. 12, 2012

(65) Prior Publication Data
US 2014/0163805 A1 Jun. 12, 2014

(51) Int. Cl.
G05D 1/00 (2006.01)
E02F 9/20 (2006.01)
E02F 9/26 (2006.01)
G05D 1/02 (2006.01)

(52) U.S. Cl.
CPC ............ *E02F 9/205* (2013.01); *E02F 9/2054* (2013.01); *E02F 9/265* (2013.01); *G05D 1/021* (2013.01); *G05D 2201/0202* (2013.01)

(58) Field of Classification Search
None
See application file for complete search history.

(56) References Cited

U.S. PATENT DOCUMENTS

| | | | | |
|---|---|---|---|---|
| 4,716,530 A * | 12/1987 | Ogawa et al. | | 701/23 |
| 6,643,582 B2 * | 11/2003 | Adachi et al. | | 701/516 |
| 6,778,928 B2 * | 8/2004 | Stiller | | 702/104 |
| 7,162,339 B2 * | 1/2007 | Nguyen | | 701/29.3 |
| 7,588,088 B2 * | 9/2009 | Zachman | | 172/4.5 |
| 7,593,963 B2 * | 9/2009 | Ballesty et al. | | 1/1 |
| 7,680,639 B2 * | 3/2010 | Schoeggl | | 703/8 |
| 8,160,766 B2 * | 4/2012 | Donnelli | | 701/33.7 |
| 8,463,460 B2 * | 6/2013 | Sprock et al. | | 701/2 |
| 8,655,505 B2 * | 2/2014 | Sprock et al. | | 701/2 |
| 2002/0059075 A1 * | 5/2002 | Schick et al. | | 705/1 |
| 2006/0025894 A1 * | 2/2006 | O'Connor et al. | | 701/1 |
| 2006/0164295 A1 * | 7/2006 | Focke et al. | | 342/174 |
| 2007/0016328 A1 * | 1/2007 | Ziegler et al. | | 700/245 |
| 2007/0124050 A1 * | 5/2007 | Donnelli et al. | | 701/50 |
| 2008/0027590 A1 * | 1/2008 | Phillips et al. | | 701/2 |
| 2008/0294690 A1 * | 11/2008 | McClellan et al. | | 707/104.1 |
| 2009/0198422 A1 * | 8/2009 | Vik et al. | | 701/50 |

(Continued)

OTHER PUBLICATIONS

Ramadev Hukkeri et al, "Vehicle Model Calibration System for a Mobile Machine", filed Jun. 30, 2011 for U.S. Appl. No. 13/173,341.

(Continued)

*Primary Examiner* — Helal A Algahaim
*Assistant Examiner* — Kelly E Darby
(74) *Attorney, Agent, or Firm* — Finnegan, Henderson, Farabow, Garrett & Dunner, LLP

(57) ABSTRACT

A method is disclosed of modifying a worksite for calibrating a vehicle model used to autonomously control a first machine on the worksite. The method may include receiving a signal from the first machine indicative of an aspect of the vehicle model in need of calibration. The method may also include determining, in response to receipt of the signal, that the worksite includes a calibration site having a characteristic corresponding to the aspect of the vehicle model, and that calibrating the aspect of the vehicle model requires modifying the characteristic of the calibration site. The method may further include autonomously modifying the characteristic of the calibration site with a second machine at the worksite, and directing the first machine to the modified calibration site for autonomous calibration of the aspect of the vehicle model.

9 Claims, 5 Drawing Sheets

(56) References Cited

U.S. PATENT DOCUMENTS

| | | | |
|---|---|---|---|
| 2009/0306866 A1* | 12/2009 | Malikopoulos | 701/59 |
| 2010/0076708 A1* | 3/2010 | Hukkeri et al. | 702/94 |
| 2010/0076709 A1* | 3/2010 | Hukkeri et al. | 702/94 |
| 2010/0076710 A1* | 3/2010 | Hukkeri et al. | 702/97 |
| 2010/0168957 A1* | 7/2010 | Takahashi | 701/34 |
| 2010/0179720 A1* | 7/2010 | Lin et al. | 701/33 |
| 2011/0160903 A1* | 6/2011 | Romanov et al. | 700/245 |
| 2013/0000092 A1* | 1/2013 | Hukkeri et al. | 29/402.01 |
| 2013/0079948 A1* | 3/2013 | Hsu et al. | 701/1 |
| 2013/0173109 A1* | 7/2013 | Hukkeri et al. | 701/23 |
| 2013/0173201 A1* | 7/2013 | Hukkeri et al. | 702/104 |
| 2014/0163773 A1* | 6/2014 | Braunstein et al. | 701/2 |
| 2014/0163779 A1* | 6/2014 | Braunstein et al. | 701/2 |
| 2014/0163805 A1* | 6/2014 | Braunstein et al. | 701/23 |

OTHER PUBLICATIONS

Ramadev Hukkeri et al., "Vehicle Model Calibration System for a Mobile Machine", filed Dec. 28, 2011 for U.S. Appl. No. 13/338,859.

* cited by examiner

METHOD OF MODIFYING A WORKSITE

TECHNICAL FIELD

The present disclosure relates generally to a method of managing a worksite and, more particularly, to a method of modifying a worksite for vehicle calibration.

BACKGROUND

Autonomous worksites are designed to provide productivity gains through more consistency in processes. Such worksites may employ a plurality of autonomous machines such as, for example, off-highway haul trucks, motor graders, and other types of heavy equipment to perform a variety of tasks. Primary operation of such machines may be controlled by a combination of on-board and off-board computers, processors, and other electronic controllers rather than human operators. As a result, autonomous operation may enhance the productivity of the machines, and reduce the human resources required for controlling the operation of the worksite.

To operate the autonomous machines safely and efficiently on the worksite, the machines are usually equipped with sensors for detecting objects on the worksite. For example, RADAR (radio detection and ranging) sensors, SONAR (sound navigation and ranging) sensors, LIDAR (light detection and ranging) sensors, IR (infrared) and non-IR cameras, and other similar sensors may be used. The sensed objects may include specific geographical features of the worksite (for example, berms, markers, rocks, etc.), the other machines on the worksite, and any obstructions on the worksite. The machines are also generally equipped with sensors for detecting information regarding characteristics of the machine itself (for example, engine speed, travel and/or work speed, steering angle, transmission gear or gear ratio, orientation such as pitch and roll, geographical location, load weight, and load distribution). A vehicle model, which is a computer model that is used in autonomous operation of the machine on the worksite, may be stored in a computer memory of the machine. Processors on-board the machine may receive outputs from the sensors and, using the vehicle model, may predict how the machine will operate, for example, given its current speed and steering angle, and/or future drive commands of the machine. In the event the processors predict that the machine should not continue on its current course (for example, the processors predict the machine will collide with a sensed object if the machine maintains its current steering angle), the processors may also use the vehicle model to determine what changes should be made, and to predict whether these changes will, in fact, result in continued safe and efficient operation of the machine.

Periodic calibration of the vehicle model is necessary for desired machine operation since the predicted performance of the autonomous machine may vary substantially from the actual performance of the machine. For example, calibration may be required due to, among other things, a change in worksite conditions, a change in the configuration of the machine, and/or because of wear of components used in the machine.

To perform calibration of the vehicle model, the autonomous machine may undergo a series of specific tests. The tests measure the actual performance of the machine, using the uncalibrated vehicle model, under a variety of conditions, including different loads, speeds, steering angles, and orientations of the machine. After the conclusion of the testing, the actual performance of the machine under the various conditions is compared to the performance that was predicted by the uncalibrated vehicle model under those same conditions. The vehicle model may then be adjusted or calibrated based on the comparison, so that future use of the calibrated vehicle model will result in the actual operation of the autonomous machine being substantially the same as the predicted operation of the machine.

An exemplary calibration system and method is described in U.S. Patent Publication No. 2006/0164295 (the '295 publication) by Focke et al. published on Jul. 27, 2006. Specifically, the '295 publication describes a system for simultaneous calibration of two different types of sensors, for example, an image sensor and a radar sensor mounted on a motor vehicle. During calibration of the two sensors, the motor vehicle is aligned in front of a calibration object in such a way that the image and radar sensors detect reference features of the calibration object and responsively create calibration data. The calibration data is used directly for calibration of the participating sensors. For example, the calibration data is used for automatic correction of a deviation of a sensor axis in relation to a vehicle longitudinal axis or by an automotive technician for mechanical adjustment of sensor placement. These procedures are possible during manufacture or repair of the motor vehicle.

Although the sensor system of the '295 publication may be helpful in calibrating machine-mounted sensors, the benefit may be limited as there are a number of different types of vehicle model calibration that may be necessary in order for an autonomous work machine to operate efficiently. For example, different loads, speeds, steering angles, and orientations of the machine may all be parameters that require calibration and/or recalibration during the lifetime of the autonomous machine.

Challenges to calibrating an autonomous work machine vehicle model may include, for example, the need for an autonomous machine to be transported to an area designated specifically for calibration-related activity. The designated area may be a significant distance from the autonomous worksite. The size of the designated area may limit the number of machines undergoing vehicle model calibration at any particular time. Further, it may take a significant amount of time to complete all of the specific tests required for complete calibration of the vehicle model. Thus, the autonomous machine may not be available to perform any task on the autonomous worksite for a relatively long period of time, until the vehicle model is completely calibrated and the autonomous machine is transported to the worksite. Subsequent recalibration of the vehicle model may result in similar disadvantages, since it may be necessary to transport the autonomous machine back to the designated area to again undergo the series of specific tests.

The disclosed systems and methods are directed to overcoming one or more of the problems set forth above and/or other problems of the prior art.

SUMMARY

The disclosure may provide a method of modifying a worksite for calibrating a vehicle model used to autonomously control a first machine on the worksite. The method may include receiving a signal from the first machine indicative of an aspect of the vehicle model in need of calibration. The method may also include determining, in response to receipt of the signal, that the worksite includes a calibration site having a characteristic corresponding to the aspect of the vehicle model, and that calibrating the aspect of the vehicle model requires modifying the characteristic of the calibration site. The method may further include autonomously modifying the characteristic of the calibration site with a second machine at the worksite, and directing the first machine to the modified calibration site for autonomous calibration of the aspect of the vehicle model.

The disclosure may further provide a method of modifying a worksite for calibrating a vehicle model used to autonomously control a first machine on the worksite. The method may include determining, with a controller associated with the machine, that an aspect of the vehicle model is in need of calibration. The method may include providing a signal, indicating that the aspect is in need of calibration, from the controller to a worksite management system disposed remote from the first machine. The method may also include determining, with the worksite management system, that the worksite includes a calibration site having a characteristic corresponding to the aspect of the vehicle model, and that calibrating the aspect of the vehicle model requires modifying the characteristic of the calibration site. The method may also include directing, with the worksite management system, a second machine at the worksite to autonomously modify the characteristic of the calibration site. The method may further include directing, with the worksite management system, the first machine to the modified calibration site for autonomous calibration of the aspect of the vehicle model.

DETAILED DESCRIPTION

Figure 1:
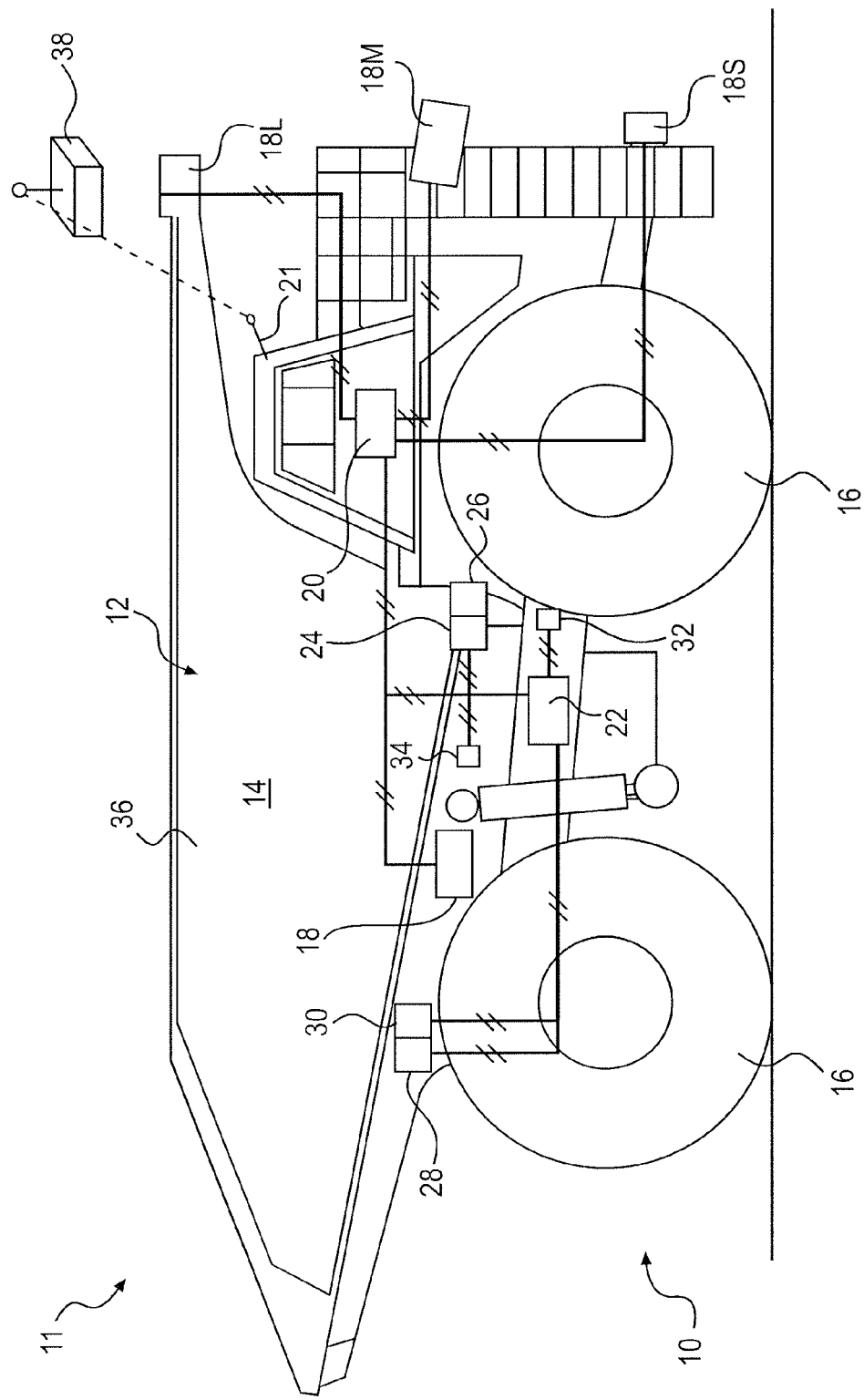
FIG. 1 is a pictorial illustration of an autonomous machine having an exemplary disclosed vehicle model calibration system.
Figure 2:
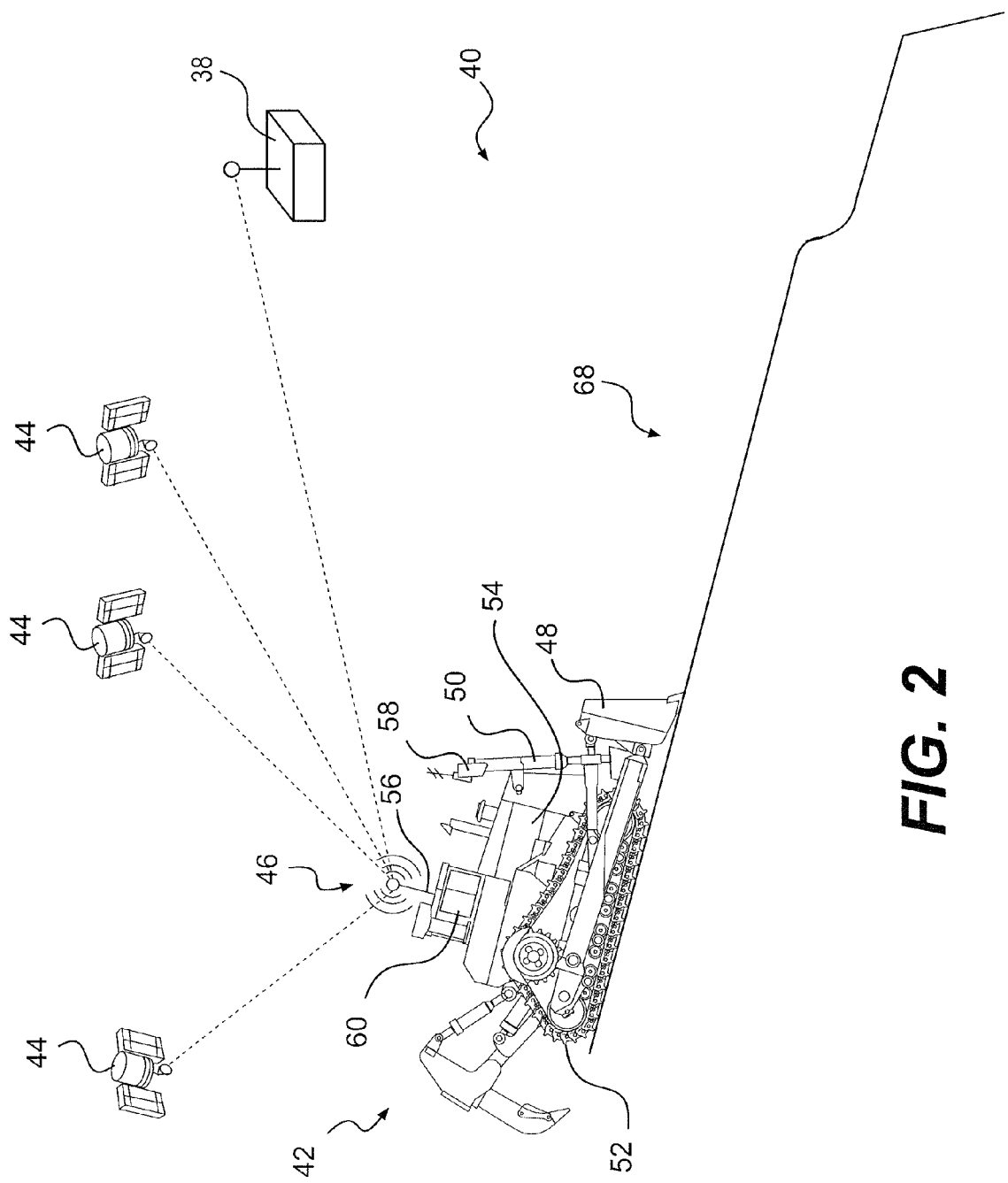
FIG. 2 is a pictorial illustration of an exemplary worksite management system coordinating the creation of an exemplary calibration path for the machine of FIG. 1.

FIG. 1 illustrates a machine 10 having an exemplary vehicle model calibration system 12 that may calibrate and/or recalibrate a vehicle model used to autonomously control machine 10 on a worksite 11 (FIG. 2). Worksite 11 may include, for example, a mine site, a landfill, a quarry, a construction site, or any other type of worksite known in the art.

Machine 10 may embody an autonomous mobile machine. An "autonomous" machine refers to an unmanned machine that includes on-board and/or off-board computers, processors, and/or other electronic controllers which, based on input from various machine sensors, stored data, and control algorithms, provides outputs to control various machine systems such as steering, braking and propulsion to accomplish desired tasks. For example, an autonomous haul truck may include on-board systems that determine the position and heading of the machine, and control steering, propulsion, and braking to follow a route provided by an off-board path planning system and to avoid obstacles in the machine's path. Semi-autonomous machines may provide some functions that are controlled by the on-board and off-board systems, while allowing an operator to control other functions. For example, for a motor grader, the on-board controller may control the machine to follow a route, while the operator controls the implement or blade. Machine 10 may include, for example, an earth moving machine such as an off-highway haul truck, a wheel loader, a motor grader, a fluid delivery truck, or any other mobile machine known in the art. Machine 10 may further include, among other things, a power source 15, and a body 14 supported by one or more traction devices 16.

Power source 15 may include an engine such as, for example, a diesel engine, a gasoline engine, a gaseous fuel powered engine such as a natural gas engine, or any other type of engine apparent to one skilled in the art. Power source 15 may alternatively include a non-combustion source of power such as a fuel cell, a power storage device, an electric motor, or other similar mechanism. Power source 15 may be connected to traction devices 16 via a direct mechanical coupling, an electric circuit, a hydraulic circuit, or in any other suitable manner.

Figure 5:
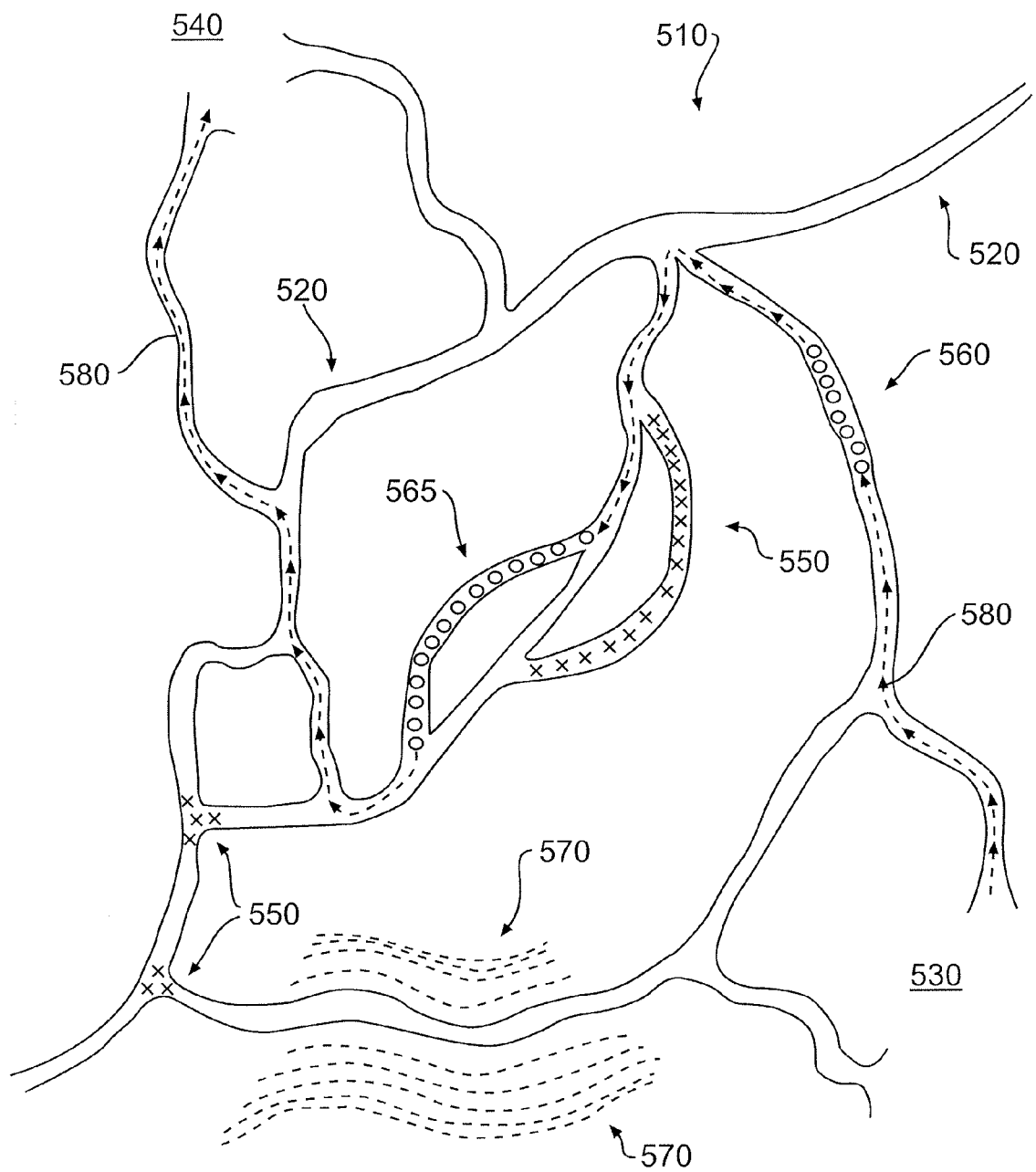
FIG. 5 is a pictorial illustration of an exemplary worksite map generated by the worksite management system.

On-board controller 20 may cause machine 10 to autonomously follow a route generated by a path planner associated with worksite 11. Machine 10 may also include a semi-autonomous or non-autonomous mobile machine. In such cases, a semi-autonomous or non-autonomous machine 10 may receive, from a path planner associated with worksite 11, recommended routes for an operator of machine 10 to consider. The recommended routes may be presented to the operator via a monitor or other electronic display. The operator of a semi-autonomous or non-autonomous machine 10 may evaluate the recommended options presented by the path planner associated with worksite 11 and select a desirable route for machine 10 to follow. A path planner associated with worksite 11 may include a worksite management system 38 which may generate a calibration plan or "calibration roadmap" designating a recommended calibration route 580 (FIG. 5) by which machine 10 may efficiently visit one or more calibration sites 40 within worksite 11 while circumventing calibration excluded (or exclusion) zones 550 (FIG. 5). A calibration exclusion zone 550 may be an area within worksite 11 that is excluded by worksite management system 38 for purposes of calibration. Calibration sites 40 may include road segments within worksite 11 that are adequate for calibration of an aspect of a vehicle model associated with machine 10. Calibration exclusion zones 550 may include road segments on worksite 11 which may include high traffic areas, for example, an intersection or a loading and/or dumping zone. Recommended calibration route 580, calibration sites 40, and calibration exclusion zones 550 will be discussed in greater detail below.

Machine 10 may safely and efficiently autonomously follow recommended calibration routes 580 by relying on data input from one or more sensors 18. As shown in FIG. 1, sensors 18 may be mounted to body 14 and may be used for object detection. The objects detected by sensors 18 may include specific areas on worksite 11, for example, areas at which material is loaded and unloaded, geographical features of worksite 11, other autonomous or human-operator-controlled machines on the worksite, and any obstructions on the worksite. In an exemplary embodiment, machine 10 may be equipped with one or more short range sensors 18S, medium range sensors 18M, and/or long range sensors 18L located at different positions around body 14 of machine 10. Each of sensors 18 (S, M, L) may embody a device that detects the position, configuration, shape, and/or orientation of objects disposed within a sensing range of the sensors 18 (S, M, L). One or more sensors 18 (S, M, L) may include a LIDAR device, a RADAR device, a SONAR device, an IR or non-IR camera device, and/or any other sensing device known in the art. In one possible example, sensors 18 (S, M, L) may include an emitter that emits a detection beam and an associated receiver that receives a reflection of that detection beam. Based on characteristics of the reflected beam, a distance and a direction from an actual sensing location of sensors 18 (S, M, L) on machine 10 to a portion of the sensed object may be determined. Sensors 18 (S, M, L) may then generate a position signal corresponding to the distance and direction, and communicate the position signal to on-board controller 20. On-board controller 20 may receive the position signal from sensors 18 (S, M, L) and, using a calibrated vehicle model, may operate machine 10 to avoid a collision with the sensed object. For example, on-board controller 20 may steer machine 10 to the left or right to avoid an object that is detected by sensors 18 (S, M, L).

Machine 10 may also be equipped with one or more sensors 22, mounted at different locations on machine 10, for detecting information regarding one or more conditions of the machine 10, such as a load carried by machine 10, a maintenance state of machine 10, and/or a location of machine 10. In an exemplary embodiment, sensors 22 may include one or more of a speed sensor 24, a steering angle sensor 26, a load weight sensor 28, a load distribution sensor 30, an orientation sensor 32, and a location and heading sensor 34.

Speed sensor 24 may detect an actual ground or travel speed of machine 10 as it moves on worksite 11. The speed of machine 10 may be detected in a variety of ways. For example, speed sensor 24 may detect a number of revolutions over a given time period for a component of a traction device 16, such as a wheel hub, and either speed sensor 24, on-board controller 20, or another processor may determine the speed of machine 10 using this information. In another embodiment, speed sensor 24 may measure an actual distance traveled by machine 10 over a given time period, and either speed sensor 24, on-board controller 20, or another processor may determine the speed of machine 10 based on this information. Speed sensor 24 is not limited to a specific location on machine 10, however, and is not limited in the way that it detects the speed of machine 10.

Steering angle sensor 26 may detect an actual steering angle of machine 10. The steering angle may be detected in a variety of ways. For example, steering angle sensor 26 may sense a location, angle, and/or other characteristic of a component of a traction device 16, such as a wheel hub. In another embodiment, steering angle sensor 26 may sense a location, angle, and/or other characteristic of another component of machine 10, such as a rack and/or a pinion when machine 10 is turned by a rack-and-pinion steering system. In that case, a rotation angle of the pinion and/or a translation of the rack may be sensed, and either steering angle sensor 26, on-board controller 20, or another processor may determine the steering angle of machine 10 using this information. Steering angle sensor 26 is not limited to a specific location on machine 10, however, and is not limited in the way that it detects the steering angle of machine 10.

Load weight sensor 28 may detect an actual weight of material being hauled by machine 10, in the event machine 10 is configured to haul material on worksite 11. The weight of the load carried by machine 10 may be detected in a variety of ways. For example, load weight sensor 28 may measure decreases in effective lengths of one or more springs supporting a dump box 36 of machine 10, and either load weight sensor 28, on-board controller 20, or another processor may determine the weight of material hauled by machine 10 using this information. Load weight sensor 28 is not limited to a specific location on machine 10, however, and is not limited in the way that it detects the weight of material being hauled by machine 10.

Load distribution sensor 30 may detect an actual distribution of the weight of the material being hauled by machine 10. The distribution of the weight hauled by machine 10 may be detected in a variety of ways. For example, load distribution sensor 30 may measure decreases in effective lengths between or among groups of springs supporting dump box 36 of machine 10. By comparing lengths of springs on the front of dump box 36 to lengths of springs on the back of dump box 36, and/or to lengths of springs on the left or right side of dump box 36, either load distribution sensor 30, on-board controller 20, or another processor may determine the distribution of the weight of the material hauled by machine 10 based on such comparisons. Load distribution sensor 30 is not limited to a specific location on machine 10, however, and is not limited in the way that it detects the distribution of weight of material being hauled by machine 10.

Orientation sensor 32 may determine an actual orientation of machine 10 on worksite 11. The orientation of machine 10 may include a roll of machine 10, which may be an angle measured about a roll axis that extends generally between a front and a back of machine 10, and/or may include a pitch of machine 10, which may be an angle measured about a pitch axis that extends generally between left and right sides of machine 10. Orientation sensor 32 may directly detect the orientation of machine 10 (e.g., detect the orientation of machine 10 relative to an artificial horizon), or may detect the orientation of an area on the ground that supports machine 10. Either orientation sensor 32, on-board controller 20, or another processor may determine the orientation of machine 10 using this information. Orientation sensor 32 is not limited to a specific location on machine 10, however, and is not limited in the way that it detects the orientation of machine 10.

Location and heading sensor 34 may determine an actual geographical location and/or an actual heading of machine 10 on worksite 11. The location and heading of machine 10 may be detected in a variety of ways. For example, sensor 34 may utilize a positioning system, to determine various operating parameters of the machine such as velocity, pitch rate, yaw rate, roll rate, etc. The positioning system may utilize Global Positioning System (GPS) data along with data from an Inertial Measurement Unit (IMU), which typically includes one or more yaw rate sensors such as gyroscopes, to calculate heading. In another embodiment, sensor 34 may include a local position detecting system that indicates the geographical location and/or heading of machine 10 relative to one or more transmitters on the worksite 11. Either sensor 34, on-board controller 20, or another processor may determine the location of machine 10 and/or the actual heading of machine 10 based on this information. Sensor 34 is not limited to a specific location on machine 10, however, and is not limited in the way that it detects the location of machine 10.

The above-described sensors 22 may generate signals corresponding to the detected conditions of machine 10, and may communicate the signals to on-board controller 20. On-board controller 20 may receive the signals from sensors 22 and enter information carried by one or more of the signals into, for example, a memory, a look-up table, a control map, and/or a control algorithm within machine 10 to maintain safe and efficient operation of machine 10 on worksite 11.

On-board controller 20 may include components configured to monitor, record, condition, store, index, process, and/or communicate information received from sensors 18 and sensors 22. These components may include, for example, a memory, one or more data storage devices, one or more processors or central processing units, and/or any other components, including tangible, physical, and non-transitory components (hardware and software), which may be used to run the disclosed application. Furthermore, although aspects of the present disclosure may be described generally as being stored within a controller memory, one skilled in the art will appreciate that these aspects can be stored on or read from different types of computer program products or non-transitory and tangible computer-readable media such as computer chips and secondary storage devices, including hard disks, floppy disks, optical media, CD-ROM, or other forms of RAM or ROM. On-board controller 20 may communicate with, receive information and/or instructions from, or otherwise be controlled by an automated worksite management system 38 (FIG. 2), such as Caterpillar Inc.'s MINESTAR SYSTEM™ or other similar systems.

Worksite management system 38 may include components configured to monitor, record, condition, store, index, process, and/or communicate information received from sensors 18, sensors 22, and/or on-board controller 20 of all machines 10 at worksite 11. These components may include, for example, a memory, one or more data storage devices, one or more processors or central processing units, or any other components, including tangible, physical, and non-transitory (hardware and software) components, which may be used to run the disclosed application.

In exemplary embodiments, worksite management system 38 may be in communication with multiple machines 10 and may track respective service-related needs of one or more machines 10. Any of the data stored by worksite management system 38 may be retrieved and addressed when machine 10 frequents a service center. Such service-related needs may include, for example, tire air pressure, status of tire treads and/or brake conditions. Worksite management system 38 may also record the time of recordation of the various service-related needs. Additionally, worksite management system 38 may schedule routine maintenance for machine 10 and/or may coordinate the repair and maintenance of machine 10 as problems arise.

In addition to service-related needs, worksite management system 38 may also monitor and address calibration-related needs for machine 10. Calibration-related needs may exist for machine 10 when machine 10 is new and/or after machine 10 has been in use for any particular amount of time. Initially, the vehicle model stored in a computer memory accessible by on-board controller 20 of machine 10 may be uncalibrated. If a vehicle model has been calibrated, over time, it may require recalibration for various reasons. For example, the vehicle model may require recalibration when replacement and/or repair of any part of machine 10 is performed. Worksite management system 38 may store preconfigured calibration needs of machine 10, and may schedule the occurrence of the calibration needs and their calibration.

In some embodiments, worksite management system 38 may coordinate with and/or otherwise control one or more machines 42 to make modifications to road geometry, road conditions, and/or other aspects of worksite 11 in order to assist in calibrating various vehicle models. Machines 42 may be semi-autonomous or non-autonomous. In such cases, for example, worksite management system 38 may provide the operator of semi-autonomous and/or non-autonomous machines 42 with recommended routes and/or actions that semi-autonomous and/or non-autonomous machines 42 may take to assist in the modification of worksite 11. Such recommended routes and/or actions may be presented to the operator via a monitor or other electronic display. FIG. 2 illustrates an exemplary machine 42 that may be used to assist in making such modifications to worksite 11. Machine 42 may embody an earth moving machine such as a dozer having a blade or other work tool 48 movable by way of one or more motors or actuators 50. Machine 42 may also include one more traction devices 52 which may function to steer and/or propel machine 42. Machine 42 may be directed by worksite management system 38 to perform a task related to the preparation of a calibration site 40. For example, such tasks may include a dozing operation, a grading operation, a leveling operation, a bulk material removal operation, and/or any other type of operation that results in alteration of the current geography and/or road conditions at calibration site 40.

As illustrated in FIG. 2, a control system 46 associated with machine 42 may include on-board components that interact to affect operation of machine 42 in response to instructions received from worksite management system 38 and/or positional information received from one or more satellites 44. In particular, control system 46 may include a power source 54 used to power actuators 50 and traction devices 52, a locating device 56, a tool position sensor 58, and/or an on-board controller 60. On-board controller 60 may be in communication with power source 54, actuators 50, traction devices 52, locating device 56, and/or position sensor 58 via multiple different communication links (not shown) to autonomously control operations of machine 42.

Power source 54 may include an engine such as, for example, a diesel engine, a gasoline engine, a gaseous fuel powered engine such as a natural gas engine, or any other type of engine apparent to one skilled in the art. Power source 54 may alternatively include a non-combustion source of power such as a fuel cell, a power storage device, an electric motor, or other similar mechanism. Power source 54 may be connected to traction devices 52 and/or actuators 50 via a direct mechanical coupling, an electric circuit, a hydraulic circuit, or in any other suitable manner.

Locating device 56 may embody an electronic receiver configured to communicate with satellites 44 to determine a location of machine 42 relative to satellites 44. In particular, locating device 56 may receive and analyze high-frequency, low power radio signals from multiple satellites 44 to triangulate a 3-D position relative to the different satellites 44. A signal indicative of this position may then be communicated from locating device 56 to on-board controller 60. Alternatively, locating device 56 may embody an Inertial Reference Unit (IRU), a component of a local tracking system, or any other known locating device that receives and/or determines positional information associated with machine 42.

Position sensor 58 may embody any type of sensor configured to detect a position of a work tool 48 relative to a known position on machine 42 (for example, relative to locating device 56), and generate a corresponding signal. In one example, position sensor 58 may be an acoustic, magnetic, or optical-type sensor associated with actuators 50 and/or one or more linkages that move work tool 48. In another example, position sensor 58 may be a local and/or global positioning sensor configured to communicate with off-board devices (for example, local laser systems, radar systems, satellites, etc.) to directly determine local and/or global coordinates of work tool 48. It should be noted that any number and/or type of position sensors 58 may be included and positioned at any location on or near work tool 48. Based on signals generated by position sensors 58 and based on known kinematics of machines 42, each on-board controller 60 may be configured to determine, in real time, a location of the associated work tool 48 relative to the known position of machine 42 and communicate the location to on-board controller 60 for further processing.

On-board controller 60 may include components configured to monitor, record, store, index, process, and/or communicate the location of machine 42 and position of work tool 48. In addition, such components may be configured to automatically control operations of machine 42 based on instructions received from worksite management system 38. These components may include, for example, a memory, one or more data storage devices, a central processing unit, or any other components that may be used to autonomously operate machine 42. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM. Such components may be similar to those described above with respect to on-board controller 20.

Tool controller 60 may further include components configured for communicating with worksite management system 38. For example, tool controller 60 may include hardware and/or software that enables sending and receiving of data messages through a direct data link (not shown) or a wireless communication link (not shown). The wireless communications may include satellite, cellular, infrared, and any other type of wireless communications that enable on-board controller 60 to exchange information with worksite management system 38.

Worksite management system 38, based on various user inputs and location information from locating device 56 and position sensor 58, may be configured to execute instructions stored on computer readable medium to perform various methods of excavation planning and control for machines 42. Such excavation planning methods may include, among other things, determining a required number, location, size, and/or shape of a plurality of cuts into an intended work surface 68 at calibration site 40. Additional excavation planning methods may include grouping the cuts into a plurality of spaced apart locations known as "slots," determining a spacing between, a size of, and/or a trajectory of such slots, and determining a sequence of particular cuts that should be excavated in order. Excavation planning methods may further include determining a number of passes through each sequence required to accomplish an excavation phase, and determining a number of phases required to complete an excavation plan. Worksite management system 38 may store in memory various excavation plans for accomplishing modifications and/or construction of calibration site 40 for possible calibration-related needs of machine 10.

Exemplary operation of worksite management system 38 is discussed below with reference to FIG. 3, FIG. 4 and FIG. 5.

INDUSTRIAL APPLICABILITY

The systems and methods of the present disclosure may be applicable to any mobile machine utilizing a vehicle model to control movement of the machine. Machine 10 may store in memory multiple vehicle models corresponding to different worksite conditions. For example, machine 10 may store different vehicle models for dry road conditions, icy road conditions, and wet road conditions. When the worksite conditions change on worksite 11, the appropriate vehicle model may be calibrated and used to control machine 10.

Machine 10 may also store in memory one or multiple vehicle models corresponding to different machine kinematics and/or dynamics, and one or more such vehicle models may be calibrated during operation. For example, machine 10 may store different vehicle models for articulated steering, front and/or rear wheel steering, and/or skid steering dynamics. During operation on the worksite 11, on-board controller 20 may select the appropriate vehicle model based on which calibrated vehicle model most closely predicts vehicle operation, and the selected vehicle model may be used to control machine 10.

In exemplary embodiments, the vehicle model used by machine 10 may be initially calibrated, and subsequently recalibrated, after a period of use so when the vehicle model is used by on-board controller 20 the predicted performance of machine 10 may be approximately equal to the actual performance of machine 10. If the predicted performance (for example, the movements and/or activity) of machine 10 is substantially similar to the actual performance of machine 10, then machine 10 will function efficiently within worksite 11.

Figure 3:
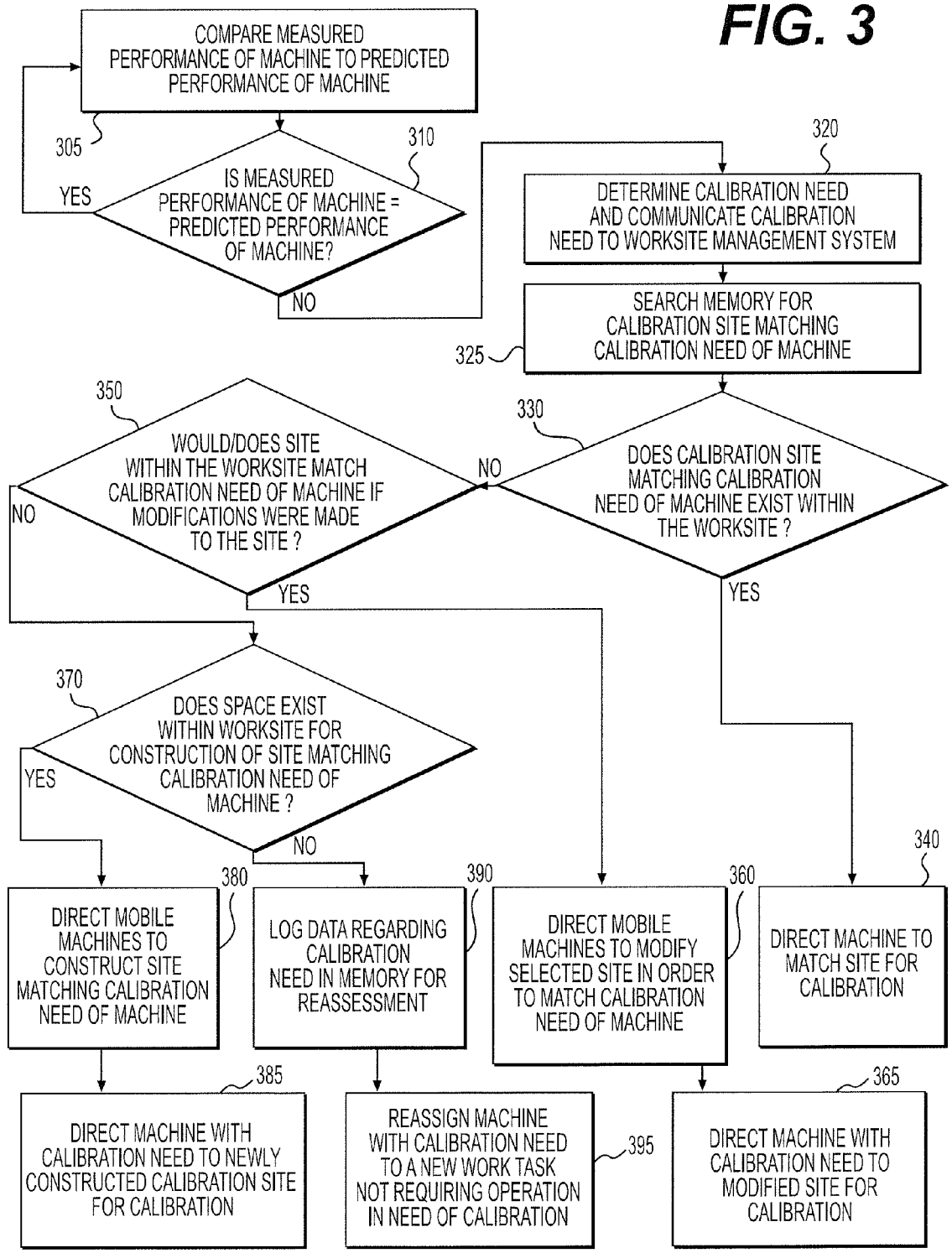
FIG. 3 is a flow chart illustrating an exemplary worksite management system operation performed for the machine of FIG. 1.

FIG. 3 illustrates an exemplary method of how worksite management system 38 may coordinate the calibration needs of machines 10 at worksite 11. Either worksite management system 38 or on-board controller 20 may monitor operating conditions of machine 10, including various loads, operating states, orientations, and/or positions of machine 10, for which calibration has either not yet been completed or for which one or more vehicle models associated with machine 10 require recalibration.

On-board controller 20 may identify when a need for calibration of an aspect of a vehicle model of machine 10 exists. In particular, at regular intervals, on-board controller 20 may use the vehicle model to predict a performance parameter of machine 10. Regular intervals may include every few hours, every few months, or after machine 10 has been in operation for a particular number of hours. At step 305, on-board controller 20 may compare a measured performance of machine 10 to a predicted (predicted by the vehicle model) performance of machine 10. In addition to comparing measured and predicted performances at regular intervals, calibration-related needs of machine 10 may also be monitored. Such needs may be monitored at similar intervals described above with regard to the vehicle model and may be monitored by sensors 18 and 22. Examples of when calibration-related needs may arise may include when wear of components on machine 10 is suspected, when a configuration of machine 10 is changed, or after machine 10 has been repaired. In each of these situations, machine 10 need not be sent to a specialized testing facility or to a remote location relative to worksite 11 in order to update the vehicle model used by on-board controller 20 to control machine 10. There may be opportunities to calibrate the vehicle model by directing machine 10 to an appropriate calibration site 40 within worksite 11.

At step 310, on-board controller 20 may determine if a measured performance parameter value of machine 10 is substantially equal to a corresponding predicted performance parameter value of machine 10. On-board controller 20 may make this determination by comparing data input from sensors 18 and 22 with data supplied by the vehicle model. Sensors 18 and 22 may provide measured values indicative of and/or quantifying the aforementioned operating conditions of machine 10. The vehicle model may provide predicted values corresponding to each of the operating conditions. If the measured values are substantially equal to the predicted values (Step 310—Yes), or if the difference between them does not exceed a threshold amount, machine 10 may continue to function with no identified need of calibration. The threshold amount may be an amount the actual performance of machine 10 is permitted to deviate from the predicted performance of machine 10 without requiring updating of the vehicle model. For example, the vehicle model may predict that based on the load weight, speed, orientation, and other conditions for machine 10, the expected stopping distance of machine 10 is 50 feet. The actual stopping distance for machine 10 under these conditions, however, may be measured by sensors 18, 22 as 54 feet. When the threshold amount is set, for example, to be a percentage of the predicted amount, such as 10%, or when the threshold is set to be a particular braking distance, such as 5 feet, the difference between the predicted and actual performance of machine 10 does not exceed the threshold amount in the above example. Thus, in this example, machine 10 may continue to operate normally and efficiently without calibrating the vehicle model. As will be described below, one or more mathematical expressions or equations may be derived to account for the differences between the predicted and actual performance values, and the vehicle model may be adjusted in view of these expressions or equations when the difference exceeds the threshold amount.

If the measured values are not substantially equal to the predicted values (Step 310—No), and/or their difference is outside a predetermined threshold, on-board controller 20 may determine that the vehicle model is in need of calibration, or recalibration. In particular, at step 320, on-board controller 20 may determine the calibration need and communicate the calibration need to worksite management system 38.

Once on-board controller 20 has identified a particular vehicle model as needing to be calibrated, and a particular aspect of the vehicle model has been identified as needing to be calibrated, on-board controller 20 may communicate this information to worksite management system 38 (step 320) via an electronic signal and/or an otherwise wireless signal. Upon receipt of the signal from on-board controller 20, worksite management system 38 may search its memory for machine-specific templates. Machine-specific templates may include data associated with machine conditions, road conditions, and/or road geometries required for the accurate calibration of the specific vehicle model related to the operation of the particular machine 10. At step 325, worksite management system 38 may search for the machine-specific template, identify the calibration conditions required to calibrate a particular vehicle model, and may search a memory for a calibration site 40 where machine 10 may perform the needed calibration. In particular, worksite management system 38 may search a memory for a calibration site 40 that matches the calibration need of machine 10. In such embodiments, data related to the road conditions and geometries of worksite 11 may be stored within a memory of worksite management system 38. The data stored in the memory may identify, among other things, the percent grade and distance of an incline in between various locations on worksite 11. The memory may also store data related to open, or otherwise undeveloped, areas of autonomous worksite 11 where new roads and/or calibration sites 40 may be constructed. At step 325, worksite management system 38 may evaluate the available calibration sites 40 by quantifying each, based on their characteristics, and identifying a match where the difference between the compared values falls within a predetermined range. The numeric value of an available calibration site 40 may be referred to as a suitability index. Worksite management system 38 may identify which calibration sites 40 have suitability indices that fall within the predetermined range. Quantifying a calibration need and/or a calibration site 40 may include assigning numerical values to various characteristics. In this way, the closeness of a match involving multiple characteristics may be gauged by a calculated percent. For example, a 95% match between a calibration requirement and the suitability index of a calibration site 40 may be deemed to be adequate and may be recognized by worksite management system 38 as a candidate match that may be pursued. If a number of candidate calibration sites 40 fall within the predetermined threshold (having a percent match of at least 95% for the present example) worksite management system 38 may automatically select the candidate calibration site 40 with the highest, or closest, match.

At step 330, worksite management system 38 may determine if a calibration site 40 matching the calibration need of machine 10 exists within worksite 11. If worksite management system 38 determines that a calibration site 40 matching the calibration need of machine 10 does exist (Step 330—Yes) within worksite 11, then worksite management system 38 may direct machine 10 to the matching calibration site 40 for calibration (Step 340). Worksite management system 38 may direct machine 10 to perforin the required calibration multiple times so as to confirm that the calibration was performed correctly.

To calibrate the vehicle model at step 340, the actual performance values of machine 10 for the variety of loads, states, and conditions may be compared to the corresponding performance values predicted by the uncalibrated vehicle model, and the uncalibrated vehicle model may be adjusted based on results of those comparisons. Autonomously calibrating an aspect of the vehicle model may include adjusting a parameter value associated with the aspect of the vehicle model to be approximately equal to a corresponding value associated with an actual performance of the machine. For example, during the calibration process machine 10 may be loaded to a certain weight, and with a certain load distribution, and may be directed to proceed relatively straight (for example, at a steering angle of about 0 degrees) on a relatively flat surface (for example, such that the roll and pitch of the machine are each about 0 degrees). Braking distance may then be measured under these conditions. For each speed at which the actual braking distance of machine 10 is determined (measured by sensors 18, 22), the uncalibrated vehicle model may be used to predict a corresponding braking distance based on the same load weight and distribution, steering angle, orientation, and the like. Comparisons of the actual and predicted braking distance values may be made, such as by on-board controller 20 or another processor. The vehicle model may be adjusted or calibrated based on results of the comparisons, such that the braking distances predicted by using the vehicle model may be substantially equal to the actual braking distances as measured by sensors 18, 22. For example, one or more mathematical expressions or equations may be derived to account for differences between expected and actual values. Similar comparisons may be made for various other combinations of conditions under which the actual performance of machine 10 is determined, so that the calibrated vehicle model may accurately predict the performance of machine 10 on worksite 11, including at loads, states, and conditions under which machine 10 was not directly tested.

In exemplary embodiments, it may be necessary or desired that worksite management system 38 direct machine 10 to multiple calibration sites 40 within worksite 11 in order to address each of the road geometry and road condition-related calibration needs of machine 10. In such embodiments, worksite management system 38 may generate a calibration plan or "calibration roadmap" designating a route by which machine 10 may visit one or more calibration sites 40 within worksite 11. Worksite management system 38 may consider a number of different variables when creating a calibration roadmap for machine 10. For example, worksite management system 38 may account for the time of day, and the traffic congestion that is characteristic of any particular time of day, and plan the calibration routes to be as time efficient as possible by avoiding high traffic areas and other potential points of concern at worksite 11. Additionally, worksite management system 38 may identify candidate calibration paths that are near a normal travel route of machine 10. A normal travel route of machine 10 may include a route that machine 10 would ordinarily take in attending to its assigned work tasks.

With continued reference to FIG. 3, if a suitable calibration site 40 cannot be identified by worksite management system 38 (Step 330—No) worksite management system 38 may proceed to step 350. At step 350, worksite management system 38 may determine whether a site within worksite 11 would match the calibration need of machine 10 if relatively minor modifications were made to the site. In particular, worksite management system 38 may determine if worksite 11 includes a calibration site 40 having a characteristic corresponding to an aspect of the vehicle model in need of calibration, and that calibration of the aspect of the vehicle model requires modifying the characteristic of calibration site 40. Identifying such a potential site may follow a similar process to that of Step 330 where the process of matching calibration needs with available potential calibration sites 40 involves quantifying each, based on their characteristics, and identifying a match where the difference between the compared values falls within a predetermined range. Alternatively, a candidate site for modification may be identified by its percentage match with the outstanding calibration need of machine 10. Matches which result in quantitative values outside the predetermined range may be assumed to require modifications that are not relatively minor.

If such a candidate calibration site 40 is identified (Step 350—Yes), various conditions and/or geometries of the road and/or terrain at the selected candidate calibration site may be modified. For example, at step 360, worksite management system 38 may direct one or more machines 42 to make necessary modifications to the selected candidate calibration site so the selected candidate calibration site matches the calibration need of machine 10. In particular, worksite management system 38 may identify the one or more aspects of the vehicle model on the particular machine 10 in need of calibration. Based on the identified aspects, worksite management system 38 may direct one or more machines 42 to create/modify conditions at the selected site so that the identified aspects of the vehicle model can be calibrated at the selected site. In such embodiments, machines 42 may be configured to modify various road geometries that may include curvatures, banks, grades, slaloms, road widths, and lane changes. Machines 42 may also be configured to modify variations of road conditions that may include dry, semi-wet, wet, very wet, icy, gravelly, and bumpy. One or more machines 42 may be dispatched and controlled by worksite management system 38 to make the required modifications in road geometry and condition at the selected calibration candidate site. Worksite management system 38 may coordinate multiple machines 42 working simultaneously at the same calibration site 40. After the selected candidate calibration site is modified, worksite management system 38 may direct machine 10 to the modified site for calibration of the vehicle model (Step 365).

Machines 42 may also load machines 10 when the calibration needs of machines 10 further include a load condition. Worksite management system 38 may direct machines 42 to load machines 10 with a load corresponding to the load condition prior to directing machines 10 to calibration site 40.

If a suitable candidate site for modification is not identified (Step 350—No), worksite management system 38 may proceed to step 370 where worksite management system 38 may determine if space exists within worksite 11 for construction of a site matching the calibration needs of machine 10. If such a space is found (Step 370—Yes), similar to Step 360, worksite management system 38 may direct machines 42 to the selected space to construct (as opposed to modify an existing calibration site 40 as in Step 360) a site matching the calibration need of machine 10 (Step 380). At step 380, one or more machines 42 may be dispatched and controlled by worksite management system 38 to construct the customized calibration site 40 with the road geometries and conditions required for calibration of the vehicle model. In exemplary embodiments, construction of a new calibration site 40 may be similar to the process described above with respect to step 360. Worksite management system 38 may direct machines 42 to construct a calibration site that matches the calibration need of machine 10 (Step 380). At step 385, worksite management system 38 may direct machine 10 to the newly constructed calibration site 40 for calibration of the vehicle model.

If an open space does not exist within worksite 11 for construction of a site matching the calibration needs of machine 10 (Step 370—No), worksite management system 38 may log the data regarding the calibration need in memory for reassessment at a later time (Step 390). The logged data may be stored for use when additional space at worksite 11 becomes available. For example, when worksite 11 expands, or a previously needed calibration site 40 is no longer needed, worksite management system 38 may revisit the logged data and reassess the opportunity to modify an existing calibration site 40, or to create a new calibration site 40 to match the calibration needs of machine 10. In the meantime, worksite management system 38 may reassign machine 10 to a new work task that does not require a work operation corresponding to the aspect of the vehicle model in need of calibration (Step 395). In an alternate embodiment, worksite management system 38 may modify how machine 10 is allowed to operate. For example, if a needed calibration relates to a particular travel speed of machine 10 worksite management system may limit the travel speed of machine 10 such that machine 10 will not reach the particular travel speed for which calibration is required. In this way, rather than reassign machine 10 to a new work task, machine 10 may be able to continue performing its original work task within the limitations established by worksite management system 38.

Figure 4:
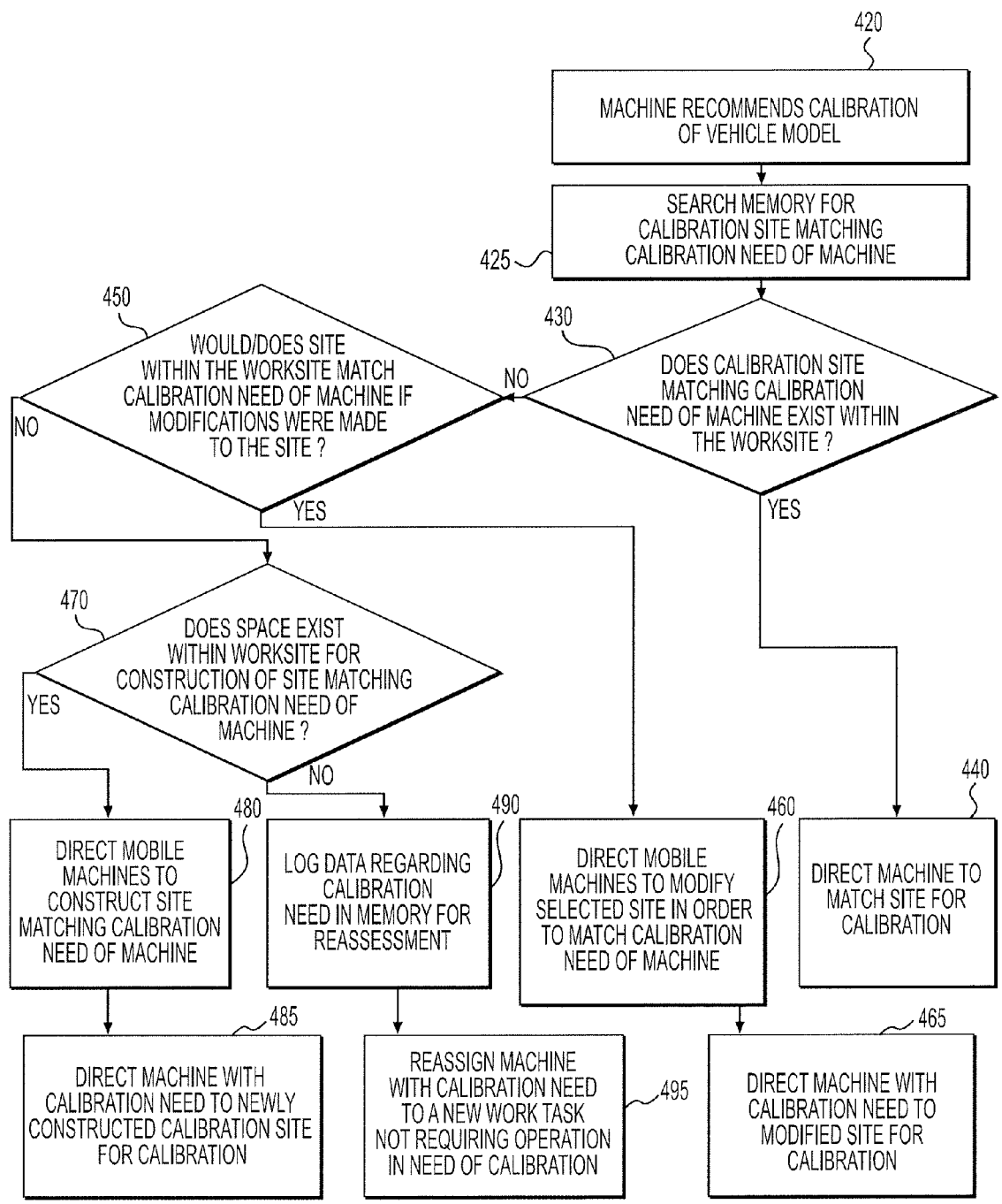
FIG. 4 is a flow chart illustrating an alternate exemplary worksite management system operation performed for the machine of FIG. 1.

FIG. 4 illustrates another exemplary method of how worksite management system 38 may coordinate the calibration needs of machine 10 at worksite 11. In the exemplary method of FIG. 4, machine 10 may be programmed to automatically alert worksite management system 38 as to when a calibration and/or recalibration need exists. Additionally, machine 10 may be programmed to alert worksite management system 38 as to which calibration needs exist at which times. Steps 425 to 495 of FIG. 4 may be identical to the analogous steps 325 to 395 of FIG. 3.

The calibration needs of machine 10, and all data related to the calibration needs of machine 10, may be stored in a memory within, or associated with, on-board controller 20. On-board controller 20 may communicate the calibration needs related to machine 10 to worksite management system 38 via a signal.

Once on-board controller 20 has identified a particular vehicle model as needing to be calibrated, and a particular aspect of the vehicle model has been identified as needing to be calibrated, on-board controller 20 may communicate this information to worksite management system 38 (step 420)

via an electronic signal and/or an otherwise wireless signal. Upon receipt of the signal from on-board controller 20, worksite management system 38 may search its memory for machine-specific templates. Machine-specific templates may include data associated with machine conditions, road conditions, and/or road geometries required for the accurate calibration of the specific vehicle model related to the operation of the particular machine 10. At step 425, worksite management system 38 may search for the machine-specific template, identify the calibration conditions required to calibrate a particular vehicle model, and may search a memory for a calibration site 40 where machine 10 may perform the needed calibration. In particular, worksite management system 38 may search a memory for a calibration site 40 that matches the calibration need of machine 10. In such embodiments, data related to the road conditions and geometries of worksite 11 may be stored within a memory of worksite management system 38. The data stored in the memory may identify, among other things, the percent grade and distance of an incline in between various locations on worksite 11. The memory may also store data related to open, or otherwise undeveloped, areas of worksite 11 where new roads and/or calibration sites 40 may be constructed. At step 425, worksite management system 38 may evaluate the available calibration sites 40 by quantifying each, based on their characteristics, and identifying a match where the difference between the compared values falls within a predetermined range. The numeric value of an available calibration site 40 may be referred to as a suitability index. Worksite management system 38 may identify which calibration sites 40 have suitability indices that fall within the predetermined range. Quantifying a calibration need and/or a calibration site 40 may include assigning numerical values to various characteristics. In this way, the closeness of a match involving multiple characteristics may be gauged by a calculated percent. For example, a 95% match between a calibration requirement and the suitability index of a calibration site 40 may be deemed to be adequate and may be recognized by worksite management system 38 as a candidate match that may be pursued. If a number of candidate calibration sites 40 fall within the predetermined threshold (having a percent match of at least 95% for the present example) worksite management system 38 may automatically select the candidate calibration site 40 with the highest, or closest, match.

At step 430, worksite management system 38 may determine if a calibration site 40 matching the calibration need of machine 10 exists within worksite 11. If worksite management system 38 determines that a calibration site 40 matching the calibration need of machine 10 does exist (Step 430—Yes) within worksite 11, then worksite management system 38 may direct machine 10 to the matching calibration site 40 for calibration (Step 440). Worksite management system 38 may direct machine 10 to perform the required calibration multiple times so as to confirm that the calibration was performed correctly.

To calibrate the vehicle model at step 440, the actual performance values of machine 10 for the variety of loads, states, and operating conditions may be compared to the corresponding performance values predicted by the uncalibrated vehicle model, and the uncalibrated vehicle model may be adjusted based on results of those comparisons. Operating conditions of machine 10 may include a travel speed of the machine, a steering rate of the machine, a braking rate of the machine, a weight hauled by the machine, a weight distribution of a load hauled by the machine, an orientation of the machine, a geographical location of the machine, and a heading of the machine. Autonomously calibrating an aspect of the vehicle model may include adjusting a parameter value associated with the aspect of the vehicle model to be approximately equal to a corresponding value associated with an actual performance of the machine. For example, during the calibration process machine 10 may be loaded to a certain weight, and with a certain load distribution, and may be directed to proceed relatively straight (for example, at a steering angle of about 0 degrees) on a relatively flat surface (for example, such that the roll and pitch of the machine are each about 0 degrees). Braking distance may then be measured under these conditions. For each speed at which the actual braking distance of machine 10 is determined (measured by sensors 18, 22), the uncalibrated vehicle model may be used to predict a corresponding braking distance based on the same load weight and distribution, steering angle, orientation, and the like. Comparisons of the actual and predicted braking distance values may be made, such as by on-board controller 20 or another processor. The vehicle model may be adjusted or calibrated based on results of the comparisons, such that the braking distances predicted by using the vehicle model may be substantially equal to the actual braking distances as measured by sensors 18, 22. For example, one or more mathematical expressions or equations may be derived to account for differences between expected and actual values. Similar comparisons may be made for various other combinations of conditions under which the actual performance of machine 10 is determined, so that the calibrated vehicle model may accurately predict the performance of machine 10 on worksite 11, including at loads, states, and conditions under which machine 10 was not directly tested.

In exemplary embodiments, it may be necessary or desired that worksite management system 38 direct machine 10 to multiple calibration sites 40 within worksite 11 in order to address each of the road geometry and road condition-related calibration needs of machine 10. In such embodiments, worksite management system 38 may generate a calibration plan or "calibration roadmap" designating a route by which machine 10 may visit one or more calibration sites 40 within worksite 11. Worksite management system 38 may consider a number of different variables when creating a calibration roadmap for machine 10. For example, worksite management system 38 may account for the time of day, and the traffic congestion that is characteristic of any particular time of day, and plan the calibration routes to be as time efficient as possible by avoiding high traffic areas and other potential points of concern at worksite 11. Additionally, worksite management system 38 may identify candidate calibration paths that are near a normal travel route of machine 10. A normal travel route of machine 10 may include a route that machine 10 would ordinarily take in attending to its assigned work tasks.

With continued reference to FIG. 4, if a suitable calibration site 40 cannot be identified by worksite management system 38 (Step 430—No) worksite management system 38 may proceed to step 450. At step 450, worksite management system 38 may determine whether a site within worksite 11 would match the calibration need of machine 10 if relatively minor modifications were made to the site. In particular, worksite management system 38 may determine if worksite 11 includes a calibration site 40 having a characteristic corresponding to an aspect of the vehicle model in need of calibration, and that calibration of the aspect of the vehicle model requires modifying the characteristic of calibration site 40. Identifying such a potential site may follow a similar process to that of Step 430 where the process of matching calibration needs with available potential calibration sites 40 involves quantifying each, based on their characteristics, and identifying a match where the difference between the compared values falls within a predetermined range. Alternatively, a candidate site for modification may be identified by its percentage match with the outstanding calibration need of machine 10. Matches which result in quantitative values outside the predetermined range may be assumed to require modifications that are not relatively minor.

If such a candidate calibration site 40 is identified (Step 450—Yes), various conditions and/or geometries of the road and/or terrain at the selected candidate calibration site may be modified. For example, at step 460, worksite management system 38 may direct one or more machines 42 to make necessary modifications to the selected candidate calibration site so the selected candidate calibration site matches the calibration need of machine 10. In particular, worksite management system 38 may identify the one or more aspects of the vehicle model on the particular machine 10 in need of calibration. Based on the identified aspects, worksite management system 38 may direct one or more machines 42 to create/modify conditions at the selected site so that the identified aspects of the vehicle model can be calibrated at the selected site. In such embodiments, machines 42 may be configured to modify various road geometries that may include curvatures, banks, grades, slaloms, road widths, and lane changes. Machines 42 may also be configured to modify variations of road conditions that may include dry, semi-wet, wet, very wet, icy, gravelly, and bumpy. One or more machines 42 may be dispatched and controlled by worksite management system 38 to make the required modifications in road geometry and condition at the selected calibration candidate site. Worksite management system 38 may coordinate multiple machines 42 working simultaneously at the same calibration site 40. After the selected candidate calibration site is modified, worksite management system 38 may direct machine 10 to the modified site for calibration of the vehicle model (Step 465).

Machines 42 may also load machines 10 when the calibration needs of machines 10 further include a load condition. Worksite management system 38 may direct machines 42 to load machines 10 with a load corresponding to the load condition prior to directing machines 10 to calibration site 40.

If a suitable candidate site for modification is not identified (Step 450—No), worksite management system 38 may proceed to step 470 where worksite management system 38 may determine if space exists within worksite 11 for construction of a site matching the calibration needs of machine 10. If such a space is found (Step 470—Yes), similar to Step 460, worksite management system 38 may direct machines 42 to the selected space to construct (as opposed to modify an existing calibration site 40 as in Step 460) a site matching the calibration need of machine 10 (Step 480). At step 480, one or more machines 42 may be dispatched and controlled by worksite management system 38 to construct the customized calibration site 40 with the road geometries and conditions required for calibration of the vehicle model. In exemplary embodiments, construction of a new calibration site 40 may be similar to the process described above with respect to step 460. Worksite management system 38 may direct machines 42 to construct a calibration site that matches the calibration need of machine 10 (Step 480). At step 485, worksite management system 38 may direct machine 10 to the newly constructed calibration site 40 for calibration of the vehicle model.

If an open space does not exist within worksite 11 for construction of a site matching the calibration needs of machine 10 (Step 470—No), worksite management system 38 may log the data regarding the calibration need in memory for reassessment at a later time (Step 490). The logged data may be stored for use when additional space at worksite 11 becomes available. For example, when worksite 11 expands, or a previously needed calibration site 40 is no longer needed, worksite management system 38 may revisit the logged data and reassess the opportunity to modify an existing calibration site 40, or to create a new calibration site 40 to match the calibration needs of machine 10. In the meantime, worksite management system 38 may reassign machine 10 to a new work task that does not require a work operation corresponding to the aspect of the vehicle model in need of calibration (Step 495). In an alternate embodiment, worksite management system 38 may modify how machine 10 is allowed to operate. For example, if a needed calibration relates to a particular travel speed of machine 10 worksite management system may limit the travel speed of machine 10 such that it will not reach the particular travel speed for which calibration is required. In this way, rather than reassign machine 10 to a new work task, machine 10 is able to continue performing its original work task within the limitations established by worksite management system 38.

FIG. 5 illustrates an exemplary worksite map 510 that worksite management system 38 may generate. Worksite management system 38 may generate worksite map 510 as a function of the above-described memory searching and data analyzing techniques, and may provide operators and/or managers of worksite 11 with recommendations as to where to direct machine 10 to perform a single calibration or multiple calibrations. In particular, during step 325 in FIG. 3 and during step 425 in FIG. 4, worksite management system 38 may search a memory for calibration sites 40 within worksite 11 that match a calibration need, or a plurality of calibration needs, related to the vehicle model of machine 10. During step 325 and/or step 425, and using data stored within the memory, worksite management system 38 may generate worksite map 510 which may display the results of the search performed by worksite management system 38 for calibration sites 40 that match the calibration needs of the vehicle model of machine 10. Additionally, worksite map 510 may display recommendations as to which calibration sites 40 would provide the most time and resource-efficient opportunity for making the necessary vehicle model calibration.

Worksite map 510 may include a depiction of various haul roads 520 and/or various zones within worksite 11. Such zones may include, for example, a loading zone 530 and a dumping zone 540. Worksite map 510 may illustrate, for example, loading zone 530, dumping zone 540, and/or other zones within worksite 11 being interconnected by one or more haul roads 520. Worksite map 510 may also include a recommended calibration site 560 (depicted by circles in FIG. 5) as well as a second recommended calibration site 565 (depicted by circles in FIG. 5). Recommended calibration site 560 may be associated with one calibration need associated with the vehicle model of machine 10, whereas second recommended calibration site 565 may be associated with a second calibration need associated with the vehicle model of machine 10. In the exemplary embodiment, recommended calibration site 560 and second recommended calibration site 565 may differ so as to address different calibration needs, or they may share similar features and present an operator and/or manager of worksite 11 with multiple options for addressing the same calibration need. Worksite map 510 may also include additional recommended calibration sites if additional calibration needs related to machine 10 exist. Worksite map 510 may include one or more recommended calibration sites and/or paths in need of modification 555 (depicted by squares in FIG. 5). As described above, recommended calibration sites and/or paths in need of modification 555 may include areas that would suffice as calibration sites 40 if modifications were made to them. Recommended calibration sites and/or paths in need of modification 555 may include stretches of haul roads 520 in need of repair. As machines 10 traverse haul roads 520, and detect road conditions via sensors 18 (S, M, L) and 22, machines 10 may alert worksite management system 38 as to instances of slippage or other phenomena that may be indicative of a haul road 520 or calibration site 40 in need of repair and/or modification. Worksite map 510 may further include one or more calibration exclusion zones 550 (depicted by the letter "x" in FIG. 5). Calibration exclusion zones 550 may include high traffic areas, for example, an intersection or a work zone such as a loading or dumping area. Calibration exclusion zones 550 may also include stretches of haul roads 520 that may be dangerous for certain machines 10 to traverse. Calibration exclusion zones 550 may be areas within worksite 11 that the operator selects and/or otherwise identifies. Further, calibration exclusion zones 550 may include areas that are designated for the calibration of other aspects of other vehicle models for other machines 10. Worksite management system 38 may identify recommended calibration site 560, second recommended calibration site 565, recommended calibration site and/or path in need of modification 555, and calibration exclusion zones 550 based on real time data, as well as landscape and/or road geometry-related data, related to worksite 11. Worksite map 510 may include any one of a number of various topographical features 570 that may indicate various details of the landscape of worksite 11. For example, one topographical feature 570 of worksite map 510 may indicate an elevation of a particular zone or segment of haul road 520.

Worksite management system 38 may provide worksite map 510 to a manager of worksite 11 via an electronic or wireless signal, and worksite map 510 may be displayed on a monitor or other medium. Worksite map 510 may be color coded. Recommended calibration routes 580 may be identified as a first color. Recommended calibration sites and/or paths in need of modification 555 may be identified as a second color. Calibration exclusion zones 550 may be identified as a third color. For example, rather than displaying circles, worksite management system 38 may depict recommended calibration site 560 and second recommended calibration site 565 as green colored segments on worksite map 510. Rather than displaying squares, worksite management system 38 may depict recommended calibration sites and/or paths in need of modification 555 as yellow colored segments on worksite map 510. Rather than displaying the letter "x", worksite management system 38 may depict calibration exclusion zones 550 as red colored segments on worksite map 510. Worksite management system 38 may present all the options related to recommended calibration sites 560, 565, recommended calibration sites and/or paths in need of modification 555, and calibration exclusion zones 550 to a manager of worksite 11. Once presented with all the aforedescribed options associated with a calibration need the manager of worksite 11 may add additional information to worksite map 510. For example, if the manager is aware of areas within worksite 11 that should be avoided when planning a calibration route, and these calibration exclusion zones 550 were not identified by worksite management system 38, the manager may manually designate the areas as such on worksite map 510.

As previously described, worksite management system 38 may generate a calibration plan or "calibration roadmap" designating a recommended calibration route 580 by which machine 10 may efficiently visit one or more calibration sites 40 within worksite 11 while circumventing calibration exclusion zones 550. Recommended calibration site 560 and second recommended calibration site 565 may correspond to calibration sites 40 as described above. As previously described, worksite management system 38 may consider a number of different variables when generating recommended calibration route 580 for machine 10. For example, worksite management system 38 may account for the time of day, and the traffic congestion that may be characteristic of a particular time of day, and plan calibration routes that take the least amount of travel time by avoiding high traffic areas and other potential points of concern at worksite 11. The high traffic areas and other potential points of concern at worksite 11 may be designated on worksite map 510 as calibration exclusion zones 550. Additionally, worksite management system 38 may plan recommended calibration route 580 to be near a normal travel route of machine 10. A normal travel route of machine 10 may include a route that machine 10 would ordinarily take in attending to its assigned work tasks.

In an exemplary embodiment, a manager and/or operator of worksite 11 may select a particular machine 10 and/or vehicle model on the display monitor, and worksite management system 38 may display a map of worksite 11 illustrating, in real time, the calibration sites available for calibration of the particular machine 10 and/or vehicle model. Worksite management system 38 may also provide the manager a summary or list of calibration and/or time-sensitive maintenance needs of machine 10. The manager may request from worksite management system 38 a proposed calibration site and or path. Worksite management system 38 may then illustrate available and proposed areas to meet the calibration needs of the particular machine 10 and/or vehicle model. Worksite management system 38 may illustrate multiple calibration maps for a plurality of various machines on the same display such that the manager may see an overall summary of calibration occurring within worksite 11, in real time.

Worksite management system 38 may simultaneously schedule and coordinate the calibrations of a plurality of machines 10 with varying calibration needs. For example, worksite management system 38 may schedule the calibration of a first machine 10 at a certain time, and may delay the needed calibration of a second machine 10 to occur after the completion of the calibration of the first machine 10. The scheduling function of worksite management system 38 may incorporate work task prioritization, traffic patterns, blasting, and other events and factors into the scheduling of calibration of different machines 10. Calibration schedules generated by worksite management system 38 may be subject to approval by a site manager.

Use of the disclosed worksite map 510 may provide numerous advantages to operators and/or managers of worksite 11. For example, by identifying recommended calibration sites 560, calibration exclusion zones 550, recommended calibration sites and/or paths in need of modification 555, and/or recommended calibration routes 580, worksite management system 38 provides recommendations to a worksite manager for proposed paths to accomplish a needed calibration in a time efficient fashion. Additionally, worksite map 510 may enable machine 10 to expend less fuel than perhaps would otherwise be required by limiting the distance machine 10 is required to travel to calibrate its vehicle model, and by limiting the amount of time machine 10 may be delayed in traffic congestion.

Use of the disclosed calibration system to initially calibrate and subsequently recalibrate the vehicle model may provide numerous advantages. As discussed above, because calibration and recalibration occur on the worksite 11, delays associated with adjustment of the vehicle model at a calibration site removed from worksite 11 may be avoided. Further, the vehicle model of machine 10 may be more accurately calibrated and recalibrated as compared to known calibration processes, since machine 10 may be calibrated using actual conditions on worksite 11.

Use of the disclosed worksite management system 38 to autonomously coordinate the modification of calibration sites 40 for calibration of the vehicle model may also provide numerous advantages. In addition to avoiding delays associated with conducting calibration at sites removed from worksite 11, worksite management system 38 may enable a more efficient use of both time and resources by creating and/or modifying calibration sites 40 within worksite 11. In particular, worksite management system 38 may facilitate the creation and/or modification of calibration sites 40 near work sites and travel routes of machines 10 such that machines 10 are calibrated in a time and travel efficient manner. Furthermore, by coordinating and performing modifications to calibration sites 40 autonomously, the human resources required for controlling operation of worksite 11 may be reduced.

It will be apparent to those skilled in the art that various modifications and variations can be made to the vehicle model calibration processes of the present disclosure. Other embodiments of the described methods and systems will be apparent to those skilled in the art from consideration of the specification and practice of the vehicle model calibration processes disclosed herein. It is intended that the specification and examples be considered as exemplary only, with a true scope of the disclosure being indicated by the following claims and their equivalents.

What is claimed is:

1. A method of modifying a worksite for calibrating a vehicle model used to autonomously control a first machine on the worksite, the method comprising:
   determining, with a controller associated with the machine, that an aspect of the vehicle model is in need of calibration;
   providing a signal, indicating that the aspect of the vehicle model is in need of calibration, from the controller to a worksite management system disposed remote from the first machine;
   determining, with the worksite management system, that the worksite includes a calibration site having a characteristic corresponding to the aspect of the vehicle model, including searching a memory storing data associated with the worksite and selecting the calibration site from among a plurality of locations at the worksite based on a suitability index of the calibration site, and that calibrating the aspect of the vehicle model requires modifying the characteristic of the calibration site;
   directing, with the worksite management system, a second machine at the worksite to autonomously modify the characteristic of the calibration site; and
   directing, with the worksite management system, the first machine to the modified calibration site for autonomous calibration of the aspect of the vehicle model.

2. The method according to claim 1, wherein the aspect of the vehicle model includes at least one of a speed of the first machine, a steering angle of the first machine, a weight hauled by the first machine, a weight distribution of a load hauled by the first machine, an orientation of the first machine, a geographical location of the first machine, and a heading of the first machine.

3. The method according to claim 1, wherein selecting the calibration site from among a plurality of locations at the worksite based on a suitability index of the calibration site includes comparing a quantitative value representative of a calibration requirement with suitability indices of each of the plurality of locations, and automatically selecting the calibration site which most closely matches the quantitative value of the calibration requirement.

4. The method according to claim 1, wherein the characteristic includes at least one of a curvature, a bank, a grade, a slalom, and a lane change, a wet condition, a dry condition, an icy condition, a bumpy condition, and a gravely condition, and
   wherein autonomously modifying the characteristic includes at least one of a wetting operation, an icing operation, a dozing operation, a grading operation, a leveling operation, and a bulk material removal operation.

5. The method according to claim 1, further including autonomously calibrating the aspect of the vehicle model at the modified calibration site, wherein autonomously calibrating the aspect of the vehicle model includes adjusting a parameter value associated with the aspect of the vehicle model to be approximately equal to a corresponding value associated with an actual performance of the first machine.

6. The method according to claim 1, further including receiving an additional signal from the first machine indicative of an additional aspect of the vehicle model in need of calibration;
   determining, in response to receipt of the additional signal, that the worksite does not include a calibration site having a characteristic corresponding to the additional aspect of the vehicle model; and
   determining, in response to determining that the worksite does not include a calibration site having the characteristic corresponding to the additional aspect of the vehicle model, if a space exists within the worksite for constructing a calibration site having the characteristic corresponding to the additional aspect of the vehicle model.

7. The method according to claim 6, further including the worksite management system logging data associated with the additional aspect of the vehicle model in a memory for reassessment, in response to determining that no space exists within the worksite for constructing a calibration site having the characteristic corresponding to the additional aspect of the vehicle model, and
   assigning the first machine to a work task not requiring operation associated with the additional aspect of the vehicle model, in response to determining that no space exists within the worksite for constructing a calibration site having the characteristic corresponding to the additional aspect of the vehicle model.

8. The method according to claim 6, further including the worksite management system autonomously directing the second machine to construct a calibration site having the characteristic corresponding to the additional aspect of the vehicle model, in response to determining that space does exist within the worksite for constructing a calibration site having the characteristic corresponding to the additional aspect of the vehicle model.

9. A system configured to modify a worksite for calibrating a vehicle model used to autonomously control a first machine on the worksite, the system comprising:
   a controller disposed on the first machine, the controller configured to determine if an aspect of the vehicle model is in need of calibration, and to generate a signal indicative of an aspect of the vehicle model in need of calibration; and
   a worksite management system disposed remote from the first machine and in communication with the controller, the worksite management system configured to determine, in response to receipt of the signal,
whether the worksite includes a calibration site having a characteristic corresponding to the aspect of the vehicle model, including searching a memory storing data associated with the worksite and selecting the calibration site from among a plurality of locations at the worksite based on a suitability index of the calibration site, and
that calibrating the aspect of the vehicle model requires modifying the characteristic of the calibration site,
wherein the worksite management system is also configured to direct a second machine at the worksite to autonomously modify the characteristic of the calibration site, and direct the first machine to the modified calibration site for autonomous calibration of the aspect of the vehicle model.

* * * * *

UNITED STATES PATENT AND TRADEMARK OFFICE
CERTIFICATE OF CORRECTION

PATENT NO.       : 9,008,886 B2                       Page 1 of 1
APPLICATION NO.  : 13/712490
DATED            : April 14, 2015
INVENTOR(S)      : Braunstein et al.

It is certified that error appears in the above-identified patent and that said Letters Patent is hereby corrected as shown below:

In The Specification

Column 12, line 18, delete "perforin" and insert -- perform --.

Signed and Sealed this
Fifteenth Day of March, 2016

Michelle K. Lee
*Director of the United States Patent and Trademark Office*